United States Patent [19]

Mok

[11] Patent Number: 5,796,581
[45] Date of Patent: Aug. 18, 1998

[54] ROTATIONAL JOINT FOR HINGED HEAT PIPE COOLING OF A COMPUTER

[75] Inventor: Lawrence Shungwei Mok, Brewster, N.Y.

[73] Assignee: International Business Machines Corporation, Armonk, N.Y.

[21] Appl. No.: 902,704

[22] Filed: Jul. 30, 1997

[51] Int. Cl.[6] .............................. G06F 1/20; H05K 7/20
[52] U.S. Cl. ................. 361/687; 361/700; 165/104.33; 165/86
[58] Field of Search .......................... 361/687–689, 361/700, 704; 165/86, 104.33; 364/708.1; G06F 1/16

[56] References Cited

U.S. PATENT DOCUMENTS 5,621,613  4/1997  Haley et al. .......................... 361/687
5,646,822  7/1997  Bhatia et al. ......................... 361/687

*Primary Examiner*—Lynn D. Feild
*Attorney, Agent, or Firm*—Scully, Scott, Murphy & Presser

[57] ABSTRACT

An arrangement and method for enhancing the cooling capacity of portable personal computers. More particularly, disclosed is an arrangement and method for increasing the cooling capacity of laptop computers through the utilization of a double-shelled rotational heat conduction apparatus which dissipates heat to the rear side of a liquid-crystal display of the laptop computer.

20 Claims, 2 Drawing Sheets

ROTATIONAL JOINT FOR HINGED HEAT PIPE COOLING OF A COMPUTER

BACKGROUND OF THE INVENTION

The present application relates to an arrangement for enhancing the cooling capacity of portable personal computers. More particularly, the invention is directed to the provision of an arrangement for increasing the cooling capacity of laptop computers through the utilization of a double-shelled rotational heat conduction apparatus which dissipates heat to the rear side of a liquid-crystal display of the laptop computer.

The capacity and performance of portable personal computers, such as laptop computers, notebook computers or the like, has recently been enhanced to such an extent that; for example, since the beginning of 1996, the thermal dissipation requirements of portable personal computers (PCs) have increased from about 10 watts to 20 watts and even higher values. This increase in the thermal dissipation requirements is a result of ever increasing CPU performance and additional functionality; such as DVD, modem, audio and the like, which are provided by future PCs. As elucidated in an article by Albert Yu, "The Future of Microprocessors", IEEE Micro, December 1996, pages 46 through 53, the trend of increasing power dissipation in the form of heat for portable personal computers will continue in the foreseeable future. Thus, at the widely employed A4 form factor for a portable personal computer; for instance, the cooling limit for a portable PC without a cooling fan is currently approximately 15 to 20 watts. Thus, providing a greater cooling capacity than the current limits in order to meet the anticipated thermal dissipation requirements of future portable personal computers, represents not only a potential competitive advantage in industry, but also provides a significant product differentiation from currently available and commercially sold portable personal computers.

In essence, as set forth hereinabove, the power consumption of laptop computers, especially the power of the CPU is continually increasing in the computer technology. Thus, for instance, the total power of a laptop computer is usually about 10 watts and has now increased to the range of about 30 to 40 watts or higher, whereas CPU power has increased from about 2 to 6 watts and, conceivably, can be as high as in the 10 watts range. Most of this power will eventually be dissipated in the form of heat to the surrounds. Consequently, being able to disperse increased amounts of heat from the laptop computer becomes a critical factor in the design and commercial aspects of laptop computers.

DISCUSSION OF THE PRIOR ART

Various arrangements and devices for increasing the cooling capacities of laptop computers are currently known in the technology.

Ishida U.S. Pat. No. 5,588,483 discloses a heat radiating apparatus for a computer possessing a heat pipe which is connected to a heat radiating plate and a heat receiving plate, and a medium for heat transfer purposes. The heat pipe includes an internal space filled with a grease having a high thermal conductivity.

Hatada et al. U.S. Pat. No. 5,313,362 discloses a laptop or notebook computer which incorporates radiator structure including fins for dissipating and eliminating heat generated therein through convection, and includes the utilization of heat pipes of various configurations.

Taiwanese Patent Publication TW272263-A discloses a cooling device for portable personal computers which includes a heat pipe having one end connected to an electronic element and the other end connected to extend along the hinge of the computer so as to conduct heat therethrough from the electronic element.

Masataka et al. "Hinged Heat Pipes for Cooling Notebook PCS", Thirteenth IEEE SEMI-THERM Symposium, 1997, discusses the utilization of hinged heat pipes for cooling notebook PCS.

SUMMARY OF THE INVENTION

In order to improve upon the cooling capacity of computers of the type discussed hereinabove, the present invention contemplates an increase in the cooling capacity of laptop computers by conducting part of the heat towards the rear side of a liquid-crystal display through the chassis or housing of the computer. For this purpose, there is employed a double-shelled rotational heat conduction apparatus which dissipates the heat generated by the electronics of the computer as described hereinbelow.

Accordingly, it is an object of the present invention to provide an apparatus for increasing the cooling capability of a laptop computer by conducting at least a portion of the heat generated during operation thereof to the rear side of a liquid-crystal display panel through the chassis of the computer.

BRIEF DESCRIPTION OF THE DRAWINGS

Reference may now be had to the following detailed description of a preferred embodiment of the invention, taken in conjunction with the accompanying drawings; in which.

DETAILED DESCRIPTION OF PREFERRED EMBODIMENT

Figure 1:
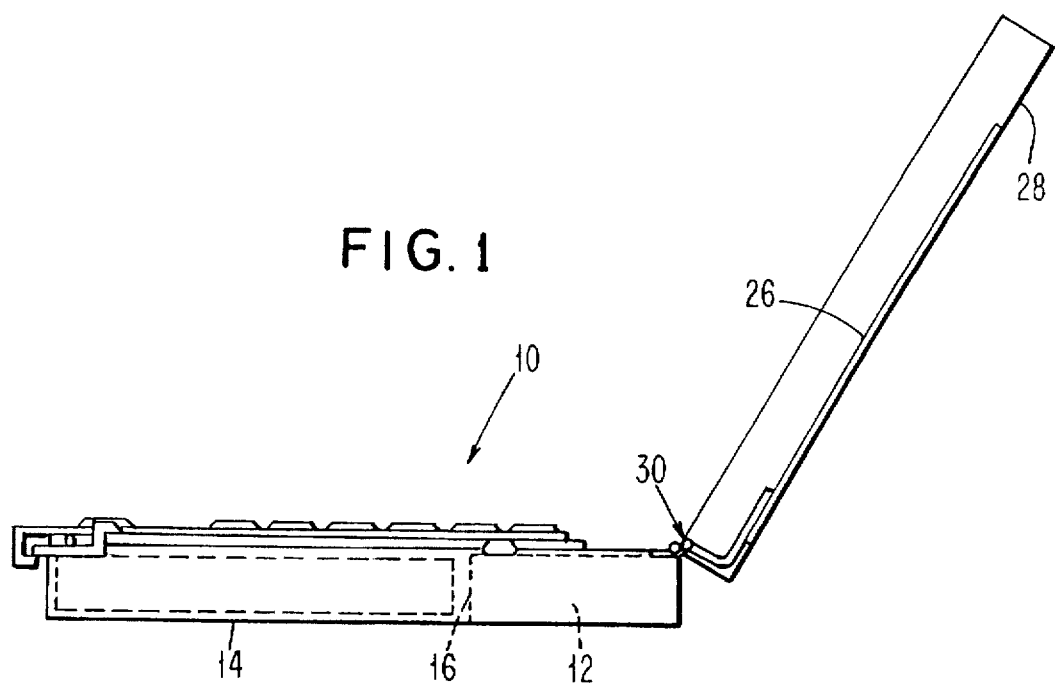
FIG. 1 generally diagrammatically illustrates a side view of a laptop computer incorporating the inventive heat conduction apparatus which connects a logic complex to a heat dissipator arranged at the rear side of a liquid-crystal display panel.
Figure 2:
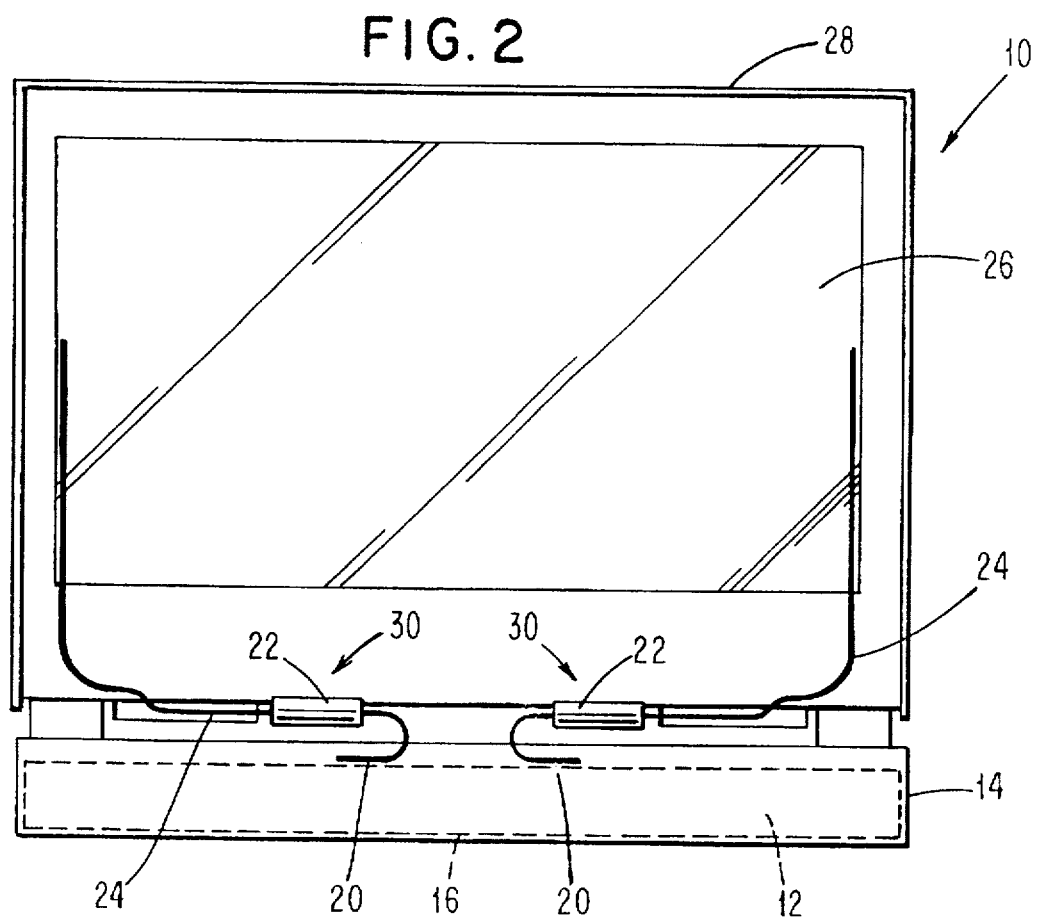
FIG. 2 illustrates a front view of the computer of FIG. 1, with the LCD panel having been omitted for purposes of clarity.

Referring to FIG. 1, a laptop computer 10 has a logic complex 12 located in the lower position or bottom keyboard housing 14 of the computer. The logic complex 12 has a CPU and other supporting logic chips and is the cause of most of the amount of heat generated in the computer. The heat generated in each of the chips is conducted to an aluminum case 16 of the logic complex 12. A heat pipe 20 is mounted on top of the case 16 of the logic complex 12. The other end of the heat-pipe 20 is connected to a double-shelled, shelled, rotational joint 22, which is connected to a second heat pipe 24. The other end of heat pipe 24 is mounted on a metal sheet 26 which is glued or suitably adhered to the inner surface of the upper chassis of housing 28 for the display panel of the laptop computer 10. FIG. 2 is a front view of this arrangement with the LCD panel omitted for purposes of clarity. Two of the inventive heat conduction apparatuses 30 each having components 20, 22, 24, 26 are shown in FIG. 2.

Figure 3:
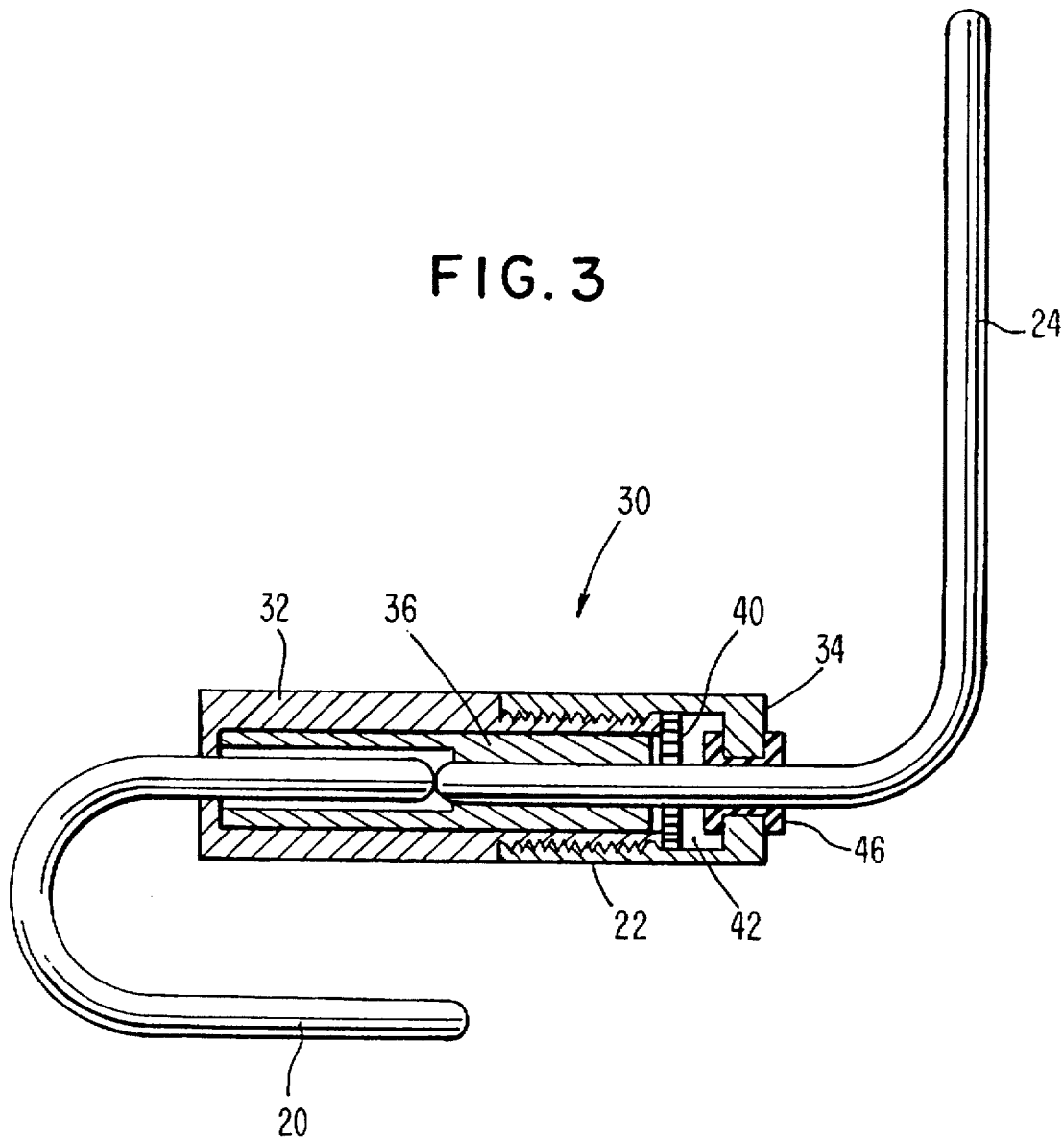
FIG. 3 illustrates a longitudinal cross-sectional view, on an enlarged scale, of a double-shelled rotational heat conduction apparatus utilized in connection with the laptop computer of FIG. 1.

FIG. 3 is a longitudinal cross-sectional view through one of the rotational heat conduction apparatuses 30. One end of the heat pipe 20 is inserted into a metal canister 32 which is in good thermal contact with the heat pipe 20. The metal canister 32 is adapted to be screwed into another metal canister 34. The second heat pipe 24 is inserted into a smaller diameter metal canister 36 which is in good thermal contact with the heat pipe 24. The metal canister 36 is then placed inside the large metal canister 32. The combined canister 32, 34 and canister 36 are each of a cylindrical shape and are tightly fit into each other such that both can rotate freely along their concentric longitudinal axes. To increase heat conduction, the small gaps between the canisters are filled with a thermally conductive grease. A perforated supporting ring 40 is provided to support the second heat pipe 24. A small chamber 42 behind the ring 40 is a grease reservoir which is used to collect excessive grease when the double-shelled, rotational joint 22 is heated up during computer operation. When the joint 22 cools down, the grease in the reservoir can flow back to the gap through the perforations in the supporting ring 40. An elastomeric seal 46 will prevent the grease from leaking to the outside. An optional disc spring which is not shown in FIG. 3 can be placed between the end of canister 36 and the perforated supporting ring 40.

While there has been shown and described what is considered to be a preferred embodiment of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

Having thus described our invention, what we claim as new, and desire to secure by Letters Patent is:

1. An arrangement for enhancing the cooling capacity of a computer having a bottom housing mounting a keyboard and containing at least one electronic component in said housing generating heat during operation of the computer; and a display panel hingedly connected with said housing proximate a rear edge thereof; said arrangement comprising at least one heat pipe structure extending between said at least one electronic component and heat dissipating means in said display panel, said at least one heat pipe structure including a first heat pipe portion having an end connected with said heat-generating electronic component and a second heat pipe portion having an end connected with said heat dissipating means; a first metal canister receiving an opposite end of said first heat pipe portion in thermal contact therewith; a second metal canister being screwed to said first metal canister to form a closed container construction; a third canister having a smaller outer diameter than the inner diameters of said first and second canisters said third canister receiving an opposite end of said second heat pipe, said third canister being arranged within said first and second canisters so as to be rotatable relative to said first and second canisters.

2. An arrangement as claimed in claim 1, wherein a perforated supporting ring radially supports said second heat pipe within said first and second canisters.

3. An arrangement as claimed in claim 2, wherein said first and second canisters form a sealed chamber.

4. An arrangement as claimed in claim 3, wherein a second chamber is formed between said perforated supporting ring and an end wall of said second canister, said second chamber being filled with a thermally-conductive grease so as to provide a grease reservoir.

5. An arrangement as claimed in claim 4, wherein gaps between said first and second canisters and said third canister and the portions of the heat pipes contained therein are filled with a thermally-conductive grease.

6. An arrangement as claimed in claim 5, wherein said perforated supporting ring facilitates a flow of grease therethrough into said grease reservoir from said gaps upon heating of the arrangement and a flow of grease from said grease reservoir into said gaps upon cooling of said arrangement.

7. An arrangement as claimed in claim 1, wherein said canisters collectively form a double-shelled rotatable joint facilitating rotational movement between said first and second canisters and said third canister about a concentric longitudinal axis.

8. An arrangement as claimed in claim 7, wherein said canisters provide a heat-transfer structure between said heat pipe portions.

9. An arrangement as claimed in claim 1, wherein two said arrangements are mounted in said computer in a spaced orientation.

10. An arrangement as claimed in claim 1, wherein said computer is a laptop computer.

11. A method of enhancing the cooling capacity of a computer having a bottom housing mounting a keyboard and containing at least one electronic component in said housing generating heat during operation of the computer; and a display panel hingedly connected with said housing proximate a rear edge thereof; said method comprising: arranging at least one heat pipe structure extending between said at least one electronic component and heat dissipating means in said display panel, said at least one heat pipe structure including a first heat pipe portion connected with said heat-generating electronic component and a second heat pipe portion having an end connected with said heat dissipating means; a first metal canister receiving an opposite end of said first heat pipe portion in thermal contact therewith; a second metal canister being screwed to said first metal canister to form a closed container construction; a third canister having a smaller outer diameter than the inner diameters of said first and second canisters receiving an opposite end of said second heat pipe, said third canister being arranged within said first and second canisters so as to be rotatable relative to said first and second canisters.

12. A method as claimed in claim 11, wherein a perforated supporting ring supports said second heat pipe within said first and second canisters.

13. A method as claimed in claim 12, wherein said first and second canisters form a sealed chamber.

14. A method as claimed in claim 13, wherein said second chamber is formed between said perforated supporting ring and an end wall of said second canister, said second chamber being filled with a thermally-conductive grease so as to provide a grease reservoir.

15. A method as claimed in claim 14, wherein gaps between said first and second canisters and said third canister and the portions of the heat pipes contained therein are filled with a thermally-conductive grease.

16. A method as claimed in claim 15, wherein said perforated supporting ring facilitates a flow of grease therethrough into said grease reservoir from said gaps upon heating of the arrangement and a flow of grease from said grease reservoir into said gaps upon cooling of said arrangement.

17. A method as claimed in claim 11, wherein said canisters collectively form a double-shelled rotatable joint facilitating rotational movement between said first and second canisters and said third canister about a concentric longitudinal axis.

18. A method as claimed in claim 17, wherein said canisters provide a heat-transfer structure between said heat pipe portions.

19. A method as claimed in claim 11, wherein two said arrangement are mounted in said computer in a spaced orientation.

20. A method as claimed in claim 11, wherein said computer is a laptop computer.

* * * * *